US012770508B2

(12) United States Patent
Kurehashi et al.

(10) Patent No.: US 12,770,508 B2
(45) Date of Patent: Oct. 20, 2026

(54) ASSISTANCE CONTROL APPARATUS, ASSISTANCE CONTROL METHOD AND COMPUTER-READABLE STORAGE MEDIUM

(71) Applicant: HONDA MOTOR CO., LTD., Tokyo (JP)

(72) Inventors: Takahiro Kurehashi, Saitama (JP); Yuta Sakagawa, Saitama (JP); Moriya Horiuchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/788,194

(22) Filed: Jul. 30, 2024

(65) Prior Publication Data

US 2025/0046182 A1 Feb. 6, 2025

(51) Int. Cl.

*G08G 1/09* (2006.01)
*G08G 1/04* (2006.01)
*G08G 1/16* (2006.01)

(52) U.S. Cl.

CPC ................. *G08G 1/09* (2013.01); *G08G 1/04* (2013.01); *G08G 1/166* (2013.01)

(58) Field of Classification Search

CPC ......... G08G 1/09; G08G 1/166; G08G 1/0104
See application file for complete search history.

(56) References Cited

U.S. PATENT DOCUMENTS

2005/0073438 A1* 4/2005 Rodgers ................. G08G 1/161 340/944
2013/0253816 A1* 9/2013 Caminiti ................ G08G 1/164 701/301
2019/0389456 A1* 12/2019 Vora .................. B60W 30/0953
2021/0166564 A1 6/2021 Takaki
(Continued)

FOREIGN PATENT DOCUMENTS

CN 106846908 B * 8/2020 ............. G08G 1/166
CN 114078317 A 2/2022
(Continued)

OTHER PUBLICATIONS

Machine Translation of Liu's reference (CN-106846908-B) (Year: 2020).*
(Continued)

*Primary Examiner* — Tarek Elarabi

(57) ABSTRACT

An assistance control apparatus comprises: a first determination unit that determines whether a traffic assistance for a first and a second moving object needs to be performed based on location information of the first and the second moving object; a second determination unit that determines, when it is determined by the first determination unit that the traffic assistance for the first the second moving object needs to be performed, whether the first the second moving object can communicate with the assistance control apparatus; and an assistance control unit that performs, when it is determined by the second determination unit that the first the second moving object cannot communicate with the assis-
(Continued)

tance control apparatus, a control for performing the traffic assistance for at least one of the first moving object or the second moving object without using communication means.

20 Claims, 6 Drawing Sheets

(56) References Cited

U.S. PATENT DOCUMENTS

| | | | | |
|---|---|---|---|---|
| 2022/0051557 | A1 | 2/2022 | Sakazaki | |
| 2022/0250613 | A1* | 8/2022 | Iyer | B60W 50/16 |
| 2022/0292961 | A1 | 9/2022 | Sudo | |
| 2022/0306092 | A1* | 9/2022 | Linkowski | H04W 4/029 |
| 2022/0314877 | A1 | 10/2022 | Yamoto | |
| 2022/0406189 | A1* | 12/2022 | Kurehashi | H04W 4/12 |
| 2024/0208495 | A1* | 6/2024 | Linkowski | G05D 1/617 |

FOREIGN PATENT DOCUMENTS

| | | | |
|---|---|---|---|
| JP | 2001116564 | A | 4/2001 |
| JP | 2019175201 | A | 10/2019 |
| JP | 2021051440 | A | 4/2021 |
| JP | 2021089732 | A | 6/2021 |
| JP | 2021092840 | A | 6/2021 |
| JP | 2022032144 | A | 2/2022 |
| JP | 2022156078 | A | 10/2022 |
| JP | 2023050629 | A | 4/2023 |

OTHER PUBLICATIONS

Office Action issued for counterpart Japanese Application No. 2023-124399, transmitted from the Japanese Patent Office on Sep. 8, 2026.

* cited by examiner

| ID | TIME | LOCATION | TYPE | ACQUISITION MEAN |
|---|---|---|---|---|
| 101 | TIME 1 | LOCATION 1 | VEHICLE | INFRASTRUCTURE CAMERA |
| 102 | TIME 2 | LOCATION 2 | VEHICLE | INFRASTRUCTRE CAMERA |
| 103 | TIME 3 | LOCATION 3 | VEHICLE | INFRASTRUCTRE CAMERA |
| 104 | TIME 4 | LOCATION 4 | PERSON | INFRASTRUCTRE CAMERA |
| 301 | TIME 5 | LOCATION 5 | VEHICLE | PROBE |
| 302 | TIME 6 | LOCATION 3' | VEHICLE | PROBE |
| ⋮ | ⋮ | ⋮ | ⋮ | ⋮ |

*FIG.3*

ASSISTANCE CONTROL APPARATUS, ASSISTANCE CONTROL METHOD AND COMPUTER-READABLE STORAGE MEDIUM

The contents of the following patent application(s) are incorporated herein by reference:
NO. 2023-124399 filed in JP on Jul. 31, 2023.

BACKGROUND

1. Technical Field

The present invention relates to an assistance control apparatus, an assistance control method, and a computer-readable storage medium.

2. Related Art

In recent years, efforts have been intensified to provide access to a sustainable transportation system with consideration given to even vulnerable people among other traffic participants. To realize this, research and development has been focused on to further improve traffic safety and convenience through research and development regarding a preventive safety technique. Patent document 1 to 2 describe techniques related to vehicle traveling assistance.

PRIOR ART DOCUMENT

Patent Document

Patent Document 1: Japanese Patent Application Publication No. 2019-175201
Patent Document 2: Japanese Patent Application Publication No. 2021-92840

BRIEF DESCRIPTION OF THE DRAWINGS

FIG. 3 shows received information received by the assistance apparatus 60 from the image-capturing apparatus 70 and the in-vehicle processing apparatus 40 in a table format.

DESCRIPTION OF EXEMPLARY EMBODIMENTS

Hereinafter, embodiments of the present invention will be described. However, the following embodiments are not for limiting the invention according to the claims. In addition, not all of the combinations of features described in the embodiments are essential to the solving means of the invention.

Figure 1:
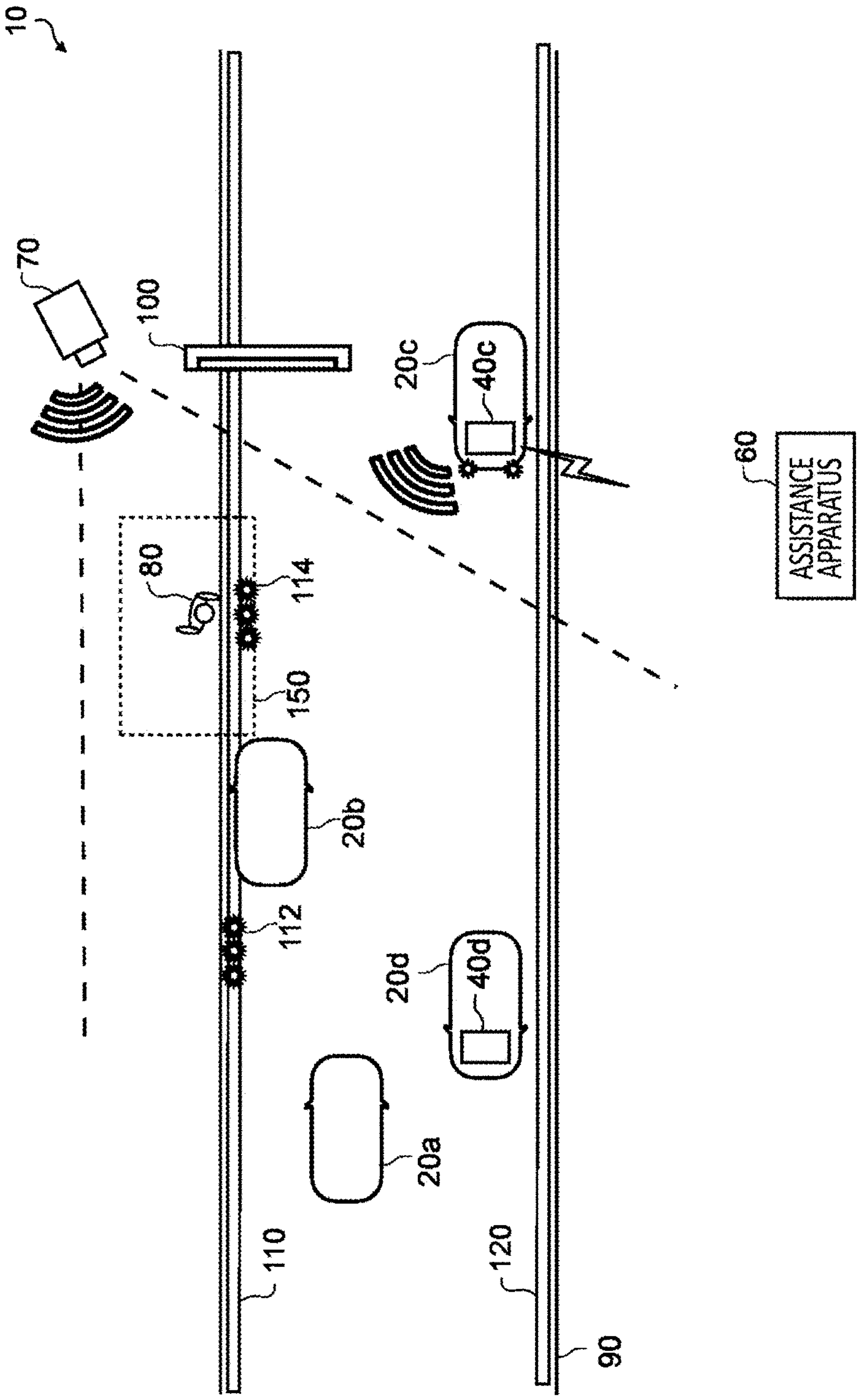
FIG. 1 schematically shows a usage scene of an assistance system 10.

FIG. 1 schematically shows a usage scene of an assistance system 10. The assistance system 10 includes a vehicle 20*a*, a vehicle 20*b*, a vehicle 20*c* and a vehicle 20*d*, an image-capturing apparatus 70, an assistance apparatus 60, a warning output apparatus 100, a warning output apparatus 110, and a warning output apparatus 120.

The vehicle 20*c* includes an in-vehicle processing apparatus 40*c* and the vehicle 20*d* includes an in-vehicle processing apparatus 40*d*. In this embodiment, the vehicle 20*a*, the vehicle 20*b*, the vehicle 20*c*, and the vehicle 20*d* may be collectively referred to as "vehicle(s) 20". The in-vehicle processing apparatus 40*c* and the in-vehicle processing apparatus 40*d* may be collectively referred to as "in-vehicle processing apparatus(es) 40". The warning output apparatus 100, the warning output apparatus 110, and the warning output apparatus 120 may be collectively referred to as "warning output apparatus(es)".

In this embodiment, the vehicle 20*b* is a vehicle stopping on a roadway 90, and the vehicle 20*a*, the vehicle 20*c* and 20*d* are vehicles driving on the roadway 90. A pedestrian 80 is walking on the roadway 90.

The in-vehicle processing apparatus 40 of each of the vehicle 20*c* and the vehicle 20*d* is configured to include a location sensor including various types of sensors such as a global navigation satellite system (GNSS) receiver, a speed sensor such as a vehicle speed sensor, and the like. The in-vehicle processing apparatus 40 includes a function of processing information acquired in the various types of sensors included in the in-vehicle processing apparatus 40 and a function of communicating with the assistance apparatus 60. The in-vehicle processing apparatus 40 provides an Advanced Driver-Assistance Systems (ADAS) function included in the vehicle 20. The in-vehicle processing apparatus 40 has a function of outputting a warning to an outside of the vehicle 20.

The image-capturing apparatus 70 is an image-capturing apparatus provided on a transportation infrastructure. The image-capturing apparatus 70 acquires a location of the vehicle 20 and the pedestrian 80 existing in an image-capturing range of the image-capturing apparatus 70 by analyzing an image that is captured, and transmits the acquired location of the vehicle 20 and the pedestrian 80 to the assistance apparatus 60. The image-capturing apparatus 70 has a function of outputting an alarm sound. The image-capturing apparatus 70 has a function of outputting an alarm sound having directionality.

The vehicle 20 and the pedestrian 80 are traffic participants and examples of moving objects that may be assistance targets of the assistance apparatus 60. In this embodiment, the vehicle 20*c* and the vehicle 20*d* can communicate with the image-capturing apparatus 70 through the in-vehicle processing apparatus 40. On the other hand, the vehicle 20*a* and the vehicle 20*b* cannot communicate with the assistance apparatus 60. The pedestrian 80 cannot communicate with the assistance apparatus 60.

The assistance apparatus 60 receives information transmitted from the in-vehicle processing apparatus 40 by mobile communication. The assistance apparatus 60 may receive information transmitted from the in-vehicle processing apparatus 40 and the image-capturing apparatus 70 through any combination of mobile communication and a communication line such as the Internet and dedicated line.

In the situation represented in FIG. 1, the image-capturing apparatus 70 identifies a location of each of the vehicle 20*a*, the vehicle 20*b*, the vehicle 20*d* and the pedestrian 80 by analyzing the image acquired by the image-capturing, and transmits the location to the assistance apparatus 60. The in-vehicle processing apparatus 40*c* and the in-vehicle processing apparatus 40*d* respectively transmit location information of the vehicle 20*c* and the vehicle 20*d*. The assistance apparatus 60 extracts a moving object that is a target of assistance from the vehicle 20 and the pedestrian 80 based on the location information received from the image-capturing apparatus 70.

In the example of FIG. 1, the assistance apparatus 60 decides an area 150 that may be out of sight from the location of the vehicle 20*a* by the presence of the vehicle 20*b* based on location information of the vehicle 20*b* and location information of the vehicle 20*a*. The assistance apparatus 60 determines to assist the vehicle 20*a* and the pedestrian 80 when it is determined that the pedestrian 80 is located in the area 150 based on the location information of the pedestrian 80.

The vehicle 20*a* and the pedestrian 80 cannot communicate with the assistance apparatus 60. Therefore, the assistance apparatus 60 outputs a warning from the warning output apparatus 100, the warning output apparatus 110, the warning output apparatus 120, the vehicle 20 including the in-vehicle processing apparatus 40, and/or the image-capturing apparatus 70. The warning output apparatus 110 and the warning output apparatus 120 are light emitting apparatuses having, on a road surface of both sides of a lane of the roadway 90, light emitters provided along an extending direction of the roadway 90, for example. The warning output apparatus 100 is an electric bulletin board and the like, for example.

As an assistance for the vehicle 20*a*, the assistance apparatus 60 causes the warning output apparatus 110 and/or the warning output apparatus 120 to output a warning.

As an assistance for the vehicle 20*a*, the assistance apparatus 60 causes the in-vehicle processing apparatus 40*c* of the vehicle 20*c* that is an oncoming vehicle of the vehicle 20*a* to output a warning to the vehicle 20*a*. For example, the assistance apparatus 60 instructs the in-vehicle processing apparatus 40*c* to flash a headlight of the vehicle 20*c* for a short time. As another mean, the assistance apparatus 60 instruct the in-vehicle processing apparatus 40*c* to output an alarm sound from a horn of the vehicle 20*c*. As another mean, the assistance apparatus 60 causes the warning output apparatus 110, from the warning output apparatus 110 or the warning output apparatus 120, that is close to the lane on which the vehicle 20*a* is driving, to emit light. Specifically, the assistance apparatus 60 causes a light emitter 112 nearby the location of the vehicle 20*a* among the light emitters included in the warning output apparatus 110 to emit light. As another mean, the assistance apparatus 60 instructs the warning output apparatus 100 that is located ahead of an advancing direction of the vehicle 20*a* to display a warning for paying attention to pedestrians. In this way, the assistance apparatus 60 informs an occupant of the vehicle 20*a* that there is a risk by the headlight flashing and/or the alarm sound from the vehicle 20*c*, the light emitting from the warning output apparatus 110, and the display from the warning output apparatus 100.

As an assistance for the pedestrian 80, the assistance apparatus 60 causes the in-vehicle processing apparatus 40*c* of the vehicle 20*c* driving nearby the pedestrian 80 to output a warning to the pedestrian 80. For example, the assistance apparatus 60 instructs the in-vehicle processing apparatus 40*c* to output an alarm sound from a horn of the vehicle 20*c*. As another mean, the assistance apparatus 60 causes the warning output apparatus 110, from the warning output apparatus 110 or the warning output apparatus 120, that is closer to the location of the pedestrian 80, to emit light. Specifically, the assistance apparatus 60 causes a light emitter 114 nearby the location of the pedestrian 80 among the light emitters included in the warning output apparatus 110 to emit light. As another mean, the assistance apparatus 60 causes the image-capturing apparatus 70 to output an alarm sound. For example, the assistance apparatus 60 causes the image-capturing apparatus 70 to output an alarm sound having directionality toward the location of the pedestrian 80. In this way, the assistance apparatus 60 informs the pedestrian 80 that there is a risk by the alarm sound from the vehicle 20*c*, the light emitting from the warning output apparatus 110, and the alarm sound from the image-capturing apparatus 70.

According to the assistance system 10, even if the pedestrian 80 and the vehicle 20*a* that are assistance targets of the assistance apparatus 60 cannot communicate with the assistance apparatus 60, the assistance can be appropriately performed. In this way, even in the presence of a vehicle not having a communication function with the outside and/or in the absence of a smartphone or a wearable terminal carried by a pedestrian, an occupant of the vehicle 20 and the pedestrian 80 can be informed that there is a risk.

Figure 2:
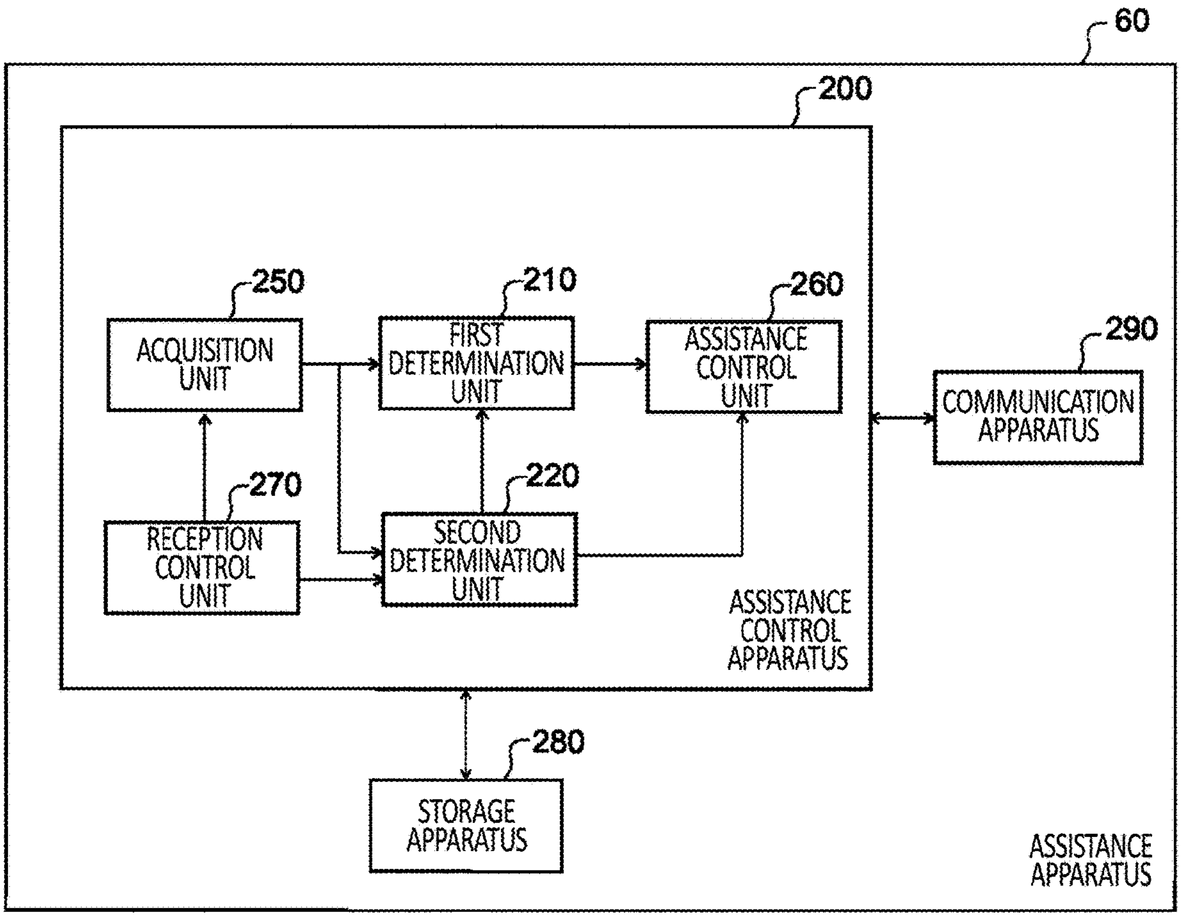
FIG. 2 shows a functional configuration of an assistance apparatus 60.

FIG. 2 shows a functional configuration of an assistance apparatus 60. The assistance apparatus 60 includes an assistance control apparatus 200, a communication apparatus 290, and a storage apparatus 280.

The communication apparatus 290 is responsible for a communication between each of the in-vehicle processing apparatus 40 and the image-capturing apparatus 70 and the assistance apparatus 60 based on a control of the assistance control apparatus 200. The assistance control apparatus 200 is implemented to include a circuit such as an arithmetic processing apparatus and the like including, for example, a processor. The assistance control apparatus 200 may be implemented by a microcomputer including a CPU, ROM, RAM, I/O, bus, and the like. The storage apparatus 280 is implemented by being provided with a non-volatile storage medium. The assistance control apparatus 200 performs a process by using information stored in the storage apparatus 280. The storage apparatus 280 stores map information including information representing a location of the roadway 90.

The assistance control apparatus 200 includes an acquisition unit 250, a first determination unit 210, a second determination unit 220, an assistance control unit 260, and a reception control unit 270. A configuration in which the assistance apparatus 60 does not have a partial function of the functional configuration represented in FIG. 2 may be adopted.

The acquisition unit 250 acquires location information of a first moving object and a second moving object. For example, the acquisition unit 250 acquires location information of the first moving object and the second moving object detected by an image-capturing apparatus 70. The acquisition unit 250 may acquire location information of the first moving object and the second moving object detected by an image-capturing apparatus 70 that is installed on the roadway 90. The acquisition unit 250 may acquire location information of the first moving object and the second moving object detected by an image-capturing apparatus that includes the in-vehicle processing apparatus 40.

The first determination unit 210 determines whether a traffic assistance for the first moving object and the second moving object needs to be performed based on the location information of the first moving object and the second moving object. When it is determined by the first determination unit 210 that the traffic assistance for the first moving object and the second moving object needs to be performed, the second determination unit 220 determines whether the first moving object and the second moving object can communicate with the assistance control apparatus 200. When it is determined by the second determination unit 220 that the first moving object and the second moving object cannot communicate with the assistance control apparatus, the assistance control unit 260 performs a control for performing the traffic assistance for at least one of the first moving object or the second moving object without using communication means. In this embodiment, the first moving object and the second moving object are the vehicle 20*a* and the pedestrian 80.

When it is determined by the second determination unit 220 that at least one moving object of the first moving object or the second moving object can communicate with the assistance control apparatus, the assistance control unit 260 performs control for performing the traffic assistance for the at least one moving object by using the communication means. For example, the assistance control unit 260 may cause an instruction to be transmitted, through a communication line, the instruction being for the in-vehicle processing apparatus 40*c* for output a warning when assistance for the pedestrian 80 and the vehicle 20*c* including a communication function needs to be performed.

When it is determined by the second determination unit 220 that the first moving object and the second moving object cannot communicate with the assistance control apparatus, the assistance control unit 260 may perform a control for performing the traffic assistance for the at least one moving object of the first moving object or the second moving object through sound or visual means.

When it is determined by the second determination unit 220 that the first moving object and the second moving object cannot communicate with the assistance control apparatus, the assistance control unit 260 may perform a control for performing, for the at least one moving object, the traffic assistance in a sound or visual manner through a moving object that is located in a predetermined range from the at least one moving object and that can communicate with the assistance control apparatus.

The reception control unit 270 performs a control for receiving, through communication means, location information of one or plurality of third moving objects that is transmitted from the one or plurality of third moving objects. When it is determined by the second determination unit 220 that the first moving object and the second moving object cannot communicate with the assistance control apparatus, the assistance control unit 260 may perform a control for selecting, based on the location information of the one or plurality of third moving objects, a moving object that is located in a predetermined range from the at least one moving object and that can communicate with the assistance control apparatus among the one or plurality of third moving objects, and performing the traffic assistance in the sound or visual manner for the at least one moving object through the moving object that is selected.

When it is determined by the second determination unit 220 that the first moving object and the second moving object cannot communicate with the assistance control apparatus, the assistance control unit 260 may select a moving object that is located in a predetermined range from the at least one moving object, that is existing ahead of an advancing direction of the at least one moving object, and that can communicate with the assistance control apparatus among the one or plurality of third moving objects.

When it is determined by the second determination unit 220 that the first moving object and the second moving object cannot communicate with the assistance control apparatus, the assistance control unit 260 may perform, for the at least one moving object, a control for performing the traffic assistance by using a display apparatus or an audio output apparatus provided on a path of the moving object. The warning output apparatus 100, the warning output apparatus 110, and the warning output apparatus 120 are examples of the display apparatus. The image-capturing apparatus 70 is an example of the audio output apparatus.

Based on the location information of the first moving object and the second moving object, the first determination unit 210 determines that the traffic assistance for the first moving object and the second moving object needs to be performed when the first moving object has a risk of approaching the second moving object. When it is determined by the second determination unit 220 that the first moving object and the second moving object cannot communicate with the assistance control apparatus, the assistance control unit 260 may perform, for the at least one moving object of the first moving object or the second moving object, a control for informing information indicating a location of another moving object or a distance to another moving object, by using a display apparatus or an audio output apparatus provided on a path of the at least one moving object. When it is determined by the second determination unit 220 that the first moving object and the second moving object cannot communicate with the assistance control apparatus, the assistance control unit 260 may perform, for the at least one moving object of the first moving object or the second moving object, a control for emphasizing and outputting warning information as a risk of approaching another moving object is higher, by using a display apparatus or an audio output apparatus provided on a path of the at least one moving object.

The reception control unit 270 performs a control for receiving, through communication means, location information of one or plurality of third moving objects that is transmitted from the one or plurality of third moving objects. When the image-capturing apparatus 70 detects the location information of the first moving object and the second moving object and no location information for matching the location information of the first moving object and the second moving object by a control of the reception control unit is received, the second determination unit 220 may determine that the first moving object and the second moving object cannot communicate with the assistance control apparatus.

FIG. 3 shows received information received by the assistance apparatus 60 from the image-capturing apparatus 70 and the in-vehicle processing apparatus 40 in a table format. The received information includes ID, clock time, location, type and acquisition means as data items.

The ID represents identification information of a moving object. The image-capturing apparatus 70 allocates the identification information to the moving object acquired by analyzing an image. Location information transmitted from the image-capturing apparatus 70 is included in the identification information allocated to the moving object by the image-capturing apparatus 70. Location information transmitted from the in-vehicle processing apparatus 40 is included in the identification information fixedly allocated to the in-vehicle processing apparatus 40.

The clock time represents a clock time at which the image-capturing apparatus 70 or the in-vehicle processing apparatus 40 acquired the location information.

The location represents the location of the moving object. Specifically, the location represents the location of the moving object acquired by analyzing the image by the image-capturing apparatus 70 or the location of the vehicle 20 acquired by the in-vehicle processing apparatus 40. The location may be latitude/longitude information, for example.

The type represents a type of the moving object. The image-capturing apparatus 70 identifies the type of the moving object acquired by analyzing the image. The location information transmitted from the image-capturing apparatus 70 includes the type of the moving object identified by the image-capturing apparatus 70. The location information transmitted from the in-vehicle processing apparatus 40 includes information representing a type of the vehicle 20 as a moving object.

The acquisition means represent acquisition means of the location information. The "infrastructure camera" of FIG. 3 represents that the acquisition means of the location information is the image-capturing apparatus 70. The "vehicle" of FIG. 3 represents that the acquisition means of the location information is the vehicle.

Here, the IDs "101", "102", and "103" in FIG. 3 are set as identification information of each of the vehicle 20*a*, the vehicle 20*b*, and the vehicle 20*d* provided by the image-capturing apparatus 70. The ID "104" is identification information of the pedestrian 80. The ID "301" and "302" is identification information of each of the vehicle 20*c* and the vehicle 20*d*.

The second determination unit 220 determines that a moving object identified by the ID "103" is the vehicle 20*d* identified by the ID "302" since a degree of coincidence between the location 3 corresponding to the ID "103" acquired from the image-capturing apparatus 70 and the location 3' corresponding to the ID "302" acquired from information transmitted from the in-vehicle processing apparatus 40*d* is higher than a predetermined value. Therefore, the second determination unit 220 determines that the moving object identified by the ID "103" can communicate with the assistance apparatus 60.

On the other hand, since a degree of coincidence between the locations corresponding to the IDs "101" and "102" acquired from the image-capturing apparatus 70 and any of the locations acquired from the location information transmitted from the in-vehicle processing apparatus 40 is lower than a predetermined value, it is determined that the moving object identified by the IDs "101" and "102" is a vehicle that does not include a communication function. Similarly, since a degree of coincidence between the locations corresponding to the ID "104" acquired from the image-capturing apparatus 70 and any of the locations acquired from the location information transmitted from another equipment including the in-vehicle processing apparatus 40 is lower than a predetermined value, it is determined that the moving object identified by the ID "104" does not carry a terminal that does not include a communication function. In this way, the assistance apparatus 60 determines that any moving object identified by the ID "101", "102" or "104" cannot communicate with the assistance apparatus 60. In this way, the assistance control unit 260 determines to perform the assistance without using communication means when the ID "101", "102" and/or "104" are assistance targets.

Figure 4:
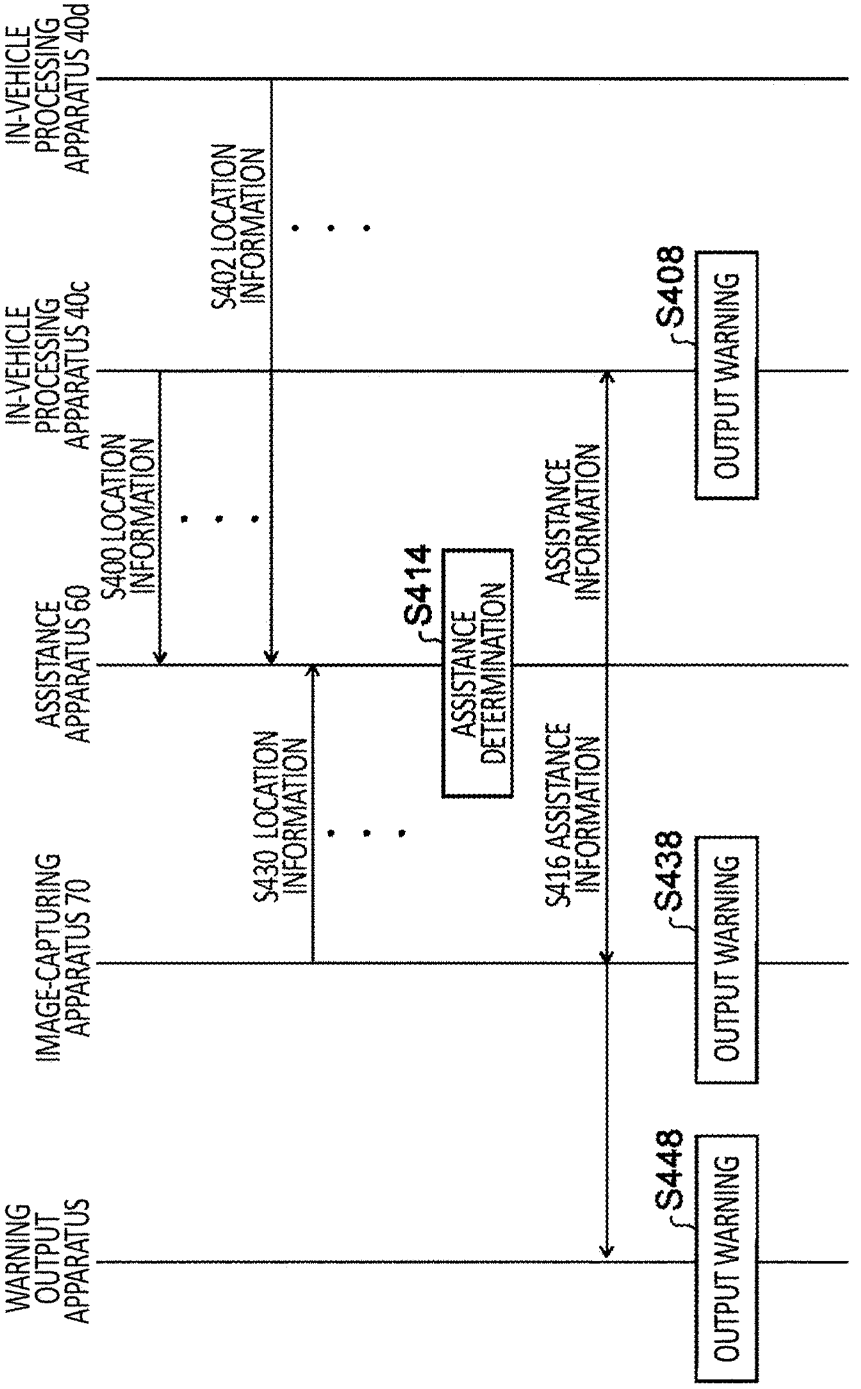
FIG. 4 shows an example of execution sequences of process of a warning output apparatus, the image-capturing apparatus 70, a vehicle 20 included in the in-vehicle processing apparatus 40 and the assistance apparatus 60.

FIG. 4 shows an example of execution sequences of process of a warning output apparatus, the image-capturing apparatus 70, a vehicle 20 included in the in-vehicle processing apparatus 40 and the assistance apparatus 60. Under the situation represented in FIG. 1, an execution sequence of FIG. 4 represents an execution sequence in a case in which the vehicle 20*a* and the pedestrian 80 are the assistance targets.

In S400, the in-vehicle processing apparatus 40*c* transmits the location information of the vehicle 20*c* to the assistance apparatus 60. In S402, the in-vehicle processing apparatus 40*d* transmits the location information of the vehicle 20*d* to the assistance apparatus 60. The location information is periodically transmitted to the assistance apparatus 60 from the in-vehicle processing apparatus 40*c* and the in-vehicle processing apparatus 40*d*.

In S430, the image-capturing apparatus 70 transmits the location information indicating the locations of the pedestrian 80, the vehicle 20*a*, the vehicle 20*b*, and the vehicle 20*d* obtained by analyzing the image captured by the image-capturing apparatus 70 and the location of each vehicle to the assistance apparatus 60. The location information is periodically transmitted to the assistance apparatus 60 from the image-capturing apparatus 70.

In S414, the first determination unit 210 of the assistance apparatus 60 determines whether to perform the assistance for the vehicle 20 and/or the pedestrian 80 based on the location information acquired from the in-vehicle processing apparatus 40 and the location information of the pedestrian 80, the vehicle 20*a*, the vehicle 20*b*, and the vehicle 20*d* acquired from the image-capturing apparatus 70. As described above, the first determination unit 210 determines that the location of the pedestrian 80 is included in the area 150 that is out of sight from the vehicle 20*a* and determines to perform the assistance for the vehicle 20*a* and the pedestrian 80. In addition, based on historical location information of each moving object of the vehicle 20 and/or the pedestrian 80, when it is determined that there is a moving object whose distance from the object and another moving object is less than a predetermined value within a predetermined time, the first determination unit 210 may determine to perform the assistance.

In the example of this execution sequence, the first determination unit 210 determines to perform the assistance for the vehicle 20*a* and the pedestrian 80. In this case, the second determination unit 220 determines that the vehicle 20*a* and the pedestrian 80 cannot communicate with the assistance apparatus 60. In this way, in S416, the assistance control unit 260 transmits assistance information, which instructs to output a warning, to the warning output apparatus 100, the warning output apparatus 110, the image-capturing apparatus 70, the in-vehicle processing apparatus 40*c*, and the image-capturing apparatus 70 that are capable of outputting a visual or sound warning to the vehicle 20*a* and the pedestrian 80.

Upon receiving the assistance information, in S408, the in-vehicle processing apparatus 40*c* outputs a warning according to an assistance warning. For example, the in-vehicle processing apparatus 40*c* outputs a warning through a lamp of a horn, a headlight, or the like. Upon receiving the assistance information, in S438, the image-capturing apparatus 70 outputs a warning by outputting an alarm sound according to the assistance information. Upon receiving the assistance information, in S448, in the warning output apparatus 100 and the warning output apparatus 110, according to the assistance information, the warning output apparatus 100 displays a warning screen, and the warning output apparatus 110 outputs a warning by light emission.

Figure 5:
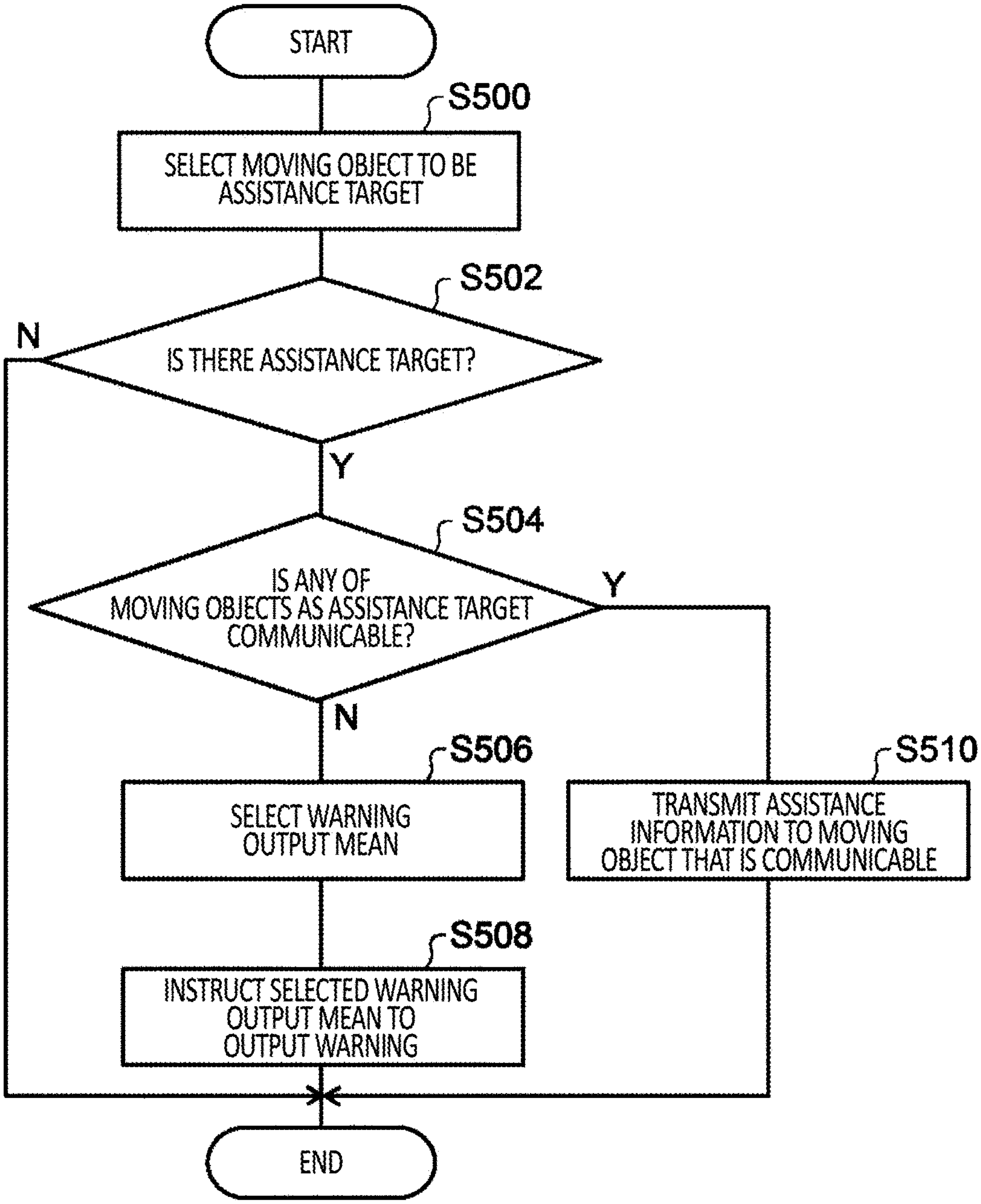
FIG. 5 shows an example of a flowchart related to an assistance control method performed by the assistance apparatus 60.

FIG. 5 shows an example of a flowchart related to an assistance control method performed by the assistance apparatus 60. The processes in this flowchart may be repeatedly performed.

In S500, the first determination unit 210 selects a moving object to be an assistance target. Specifically, the first determination unit 210 selects a moving object to which the assistance needs to be performed based on the location information from the image-capturing apparatus 70 acquired by the acquisition unit 250 and the location information of the vehicle 20 received from the in-vehicle processing apparatus 40 by the control of the reception control unit 270. For example, the first determination unit 210 selects the pedestrian 80 and the vehicle 20*a* as moving objects of the assistance target when there is the area 150 that is out of sight from the vehicle 20*a* due to the presence of the vehicle 20*c* being stopped and the location of the pedestrian 80 is included in the area 150. In addition, based on historical location information of each moving object of the vehicle 20 and/or the pedestrian 80, when it is determined that there is a moving object whose distance from the object and another moving object is less than a predetermined value within a predetermined time, the first determination unit 210 selects those moving objects and the another moving object as moving objects of the assistance target.

In S502, the first determination unit 210 determines the presence or absence of the moving object of the assistance target. If the moving object of the assistance target does not exist, the process of this flowchart ends. If the moving object of the assistance target exists, in S504, the second determination unit 220 determines whether any of the moving objects of the assistance target can communicate with the assistance apparatus 60. In S504, when it is determined that any of the moving objects of the assistance target can communicate with the assistance apparatus 60, in S510, the assistance control unit 260 transmits assistance information, which instructs to output a warning, to the moving object that can communicate with the assistance apparatus 60. For example, when the assistance target is the vehicle 20 including the in-vehicle processing apparatus 40, the assistance control unit 260 transmits assistance information, which instructs the in-vehicle processing apparatus 40 to output a warning, to the in-vehicle processing apparatus 40.

When it is determined that any of the moving objects of the assistance target cannot communicate with the assistance apparatus 60 in S504, the assistance control unit 260 selects warning output means for the moving objects of the assistance target in S506.

For example, when the pedestrian 80 and the vehicle 20*a* are the assistance target, the assistance control unit 260 selects the vehicle 20*c* that is located in a predetermined range from the pedestrian 80*a* and that can communicate with the assistance apparatus 60 as a warning output mean. The assistance control unit 260 selects the vehicle 20*c* that is located in a predetermined range from the vehicle 20*a*, can communicate with the assistance apparatus 60, and that is existing ahead of the advancing direction of the vehicle 20*a* as a warning output mean. The assistance control unit 260 selects the warning output apparatus 110 located in a predetermined range from the pedestrian 80 as a warning output mean. The assistance control unit 260 selects the warning output apparatus 100 and the warning output apparatus 110 located in a predetermined range from the vehicle 20*a* as warning output means. The assistance control unit 260 selects the image-capturing apparatus 70 located in a predetermined range from the pedestrian 80 as a warning output mean.

In S508, the assistance control unit 260 instructs the warning output means those are selected in S506 to output warnings. Specifically, the assistance control unit 260 transmits assistance information for outputting a warning to the warning output means those are selected in S506. As described above, when the pedestrian 80 and the vehicle 20*a* are the assistance targets, the assistance control unit 260 transmits the assistance information to the warning output apparatus 100, the warning output apparatus 110, the in-vehicle processing apparatus 40*c*, and the image-capturing apparatus 70

At this time, the assistance control unit 260 may transmit assistance information to the warning output apparatus 100, the information instructing displaying an object such as an arrow and the like indicating the location at which the pedestrian 80 exists.

The assistance control unit 260 may cause the warning output means to output an emphasized warning as a degree of need for assistance for the moving object is higher. The assistance control unit 260 may decide the degree of need for assistance according to a distance between objects to be the assistance targets. The assistance control unit 260 may decide the degree of need for assistance higher as the distance between objects to be the assistance targets is shorter. When the warning output apparatus 100 is caused to display the warning, the assistance control unit 260 may cause the warning to be displayed with emphasized letters according to the degree of need for assistance. The emphasized display of the warning by the warning output apparatus 100 may be performed by causing the size of the letter to be larger, causing the color of the letter to be a predetermined emphasized color, and the like. When the warning is output by light from lamps included in the warning output apparatus 110, the warning output apparatus 120, or the vehicle 20, the assistance control unit 260 may cause the light to be emitted in an emphasized manner according to the degree of need for assistance. The lamps included in the warning output apparatus 110, the warning output apparatus 120, and the vehicle 20 may emphasize the warning by increasing light emission intensity, may emphasize the warning by emitting light with the predetermined emphasized color, or may emphasize the warning by emitting light with a predetermined flashing pattern. When the warning is output by sounds from the image-capturing apparatus 70 and the vehicle 20, the assistance control unit 260 may cause the sounds to be output in an emphasized manner according to the degree of need for assistance. Alarm sound apparatuses included in the image-capturing apparatus 70 and the vehicle 20 may emphasize the warning by increasing the volume of the sounds those are output, may emphasize the warning by causing tone of sounds those are output to be a predetermined tone, or may emphasize the warning by changing the sounds those are output into a predetermined pattern.

According to the assistance system 10 described above, even if the assistance apparatus 60 cannot communicate with the vehicle or the pedestrian that are assistance targets, the assistance can be appropriately performed. In this way, for example, even in the presence of a vehicle not having a communication function with the outside and/or in the absence of a smartphone or a wearable terminal carried by a pedestrian, the assistance can be appropriately performed for an occupant of the vehicle and the pedestrian.

Figure 6:
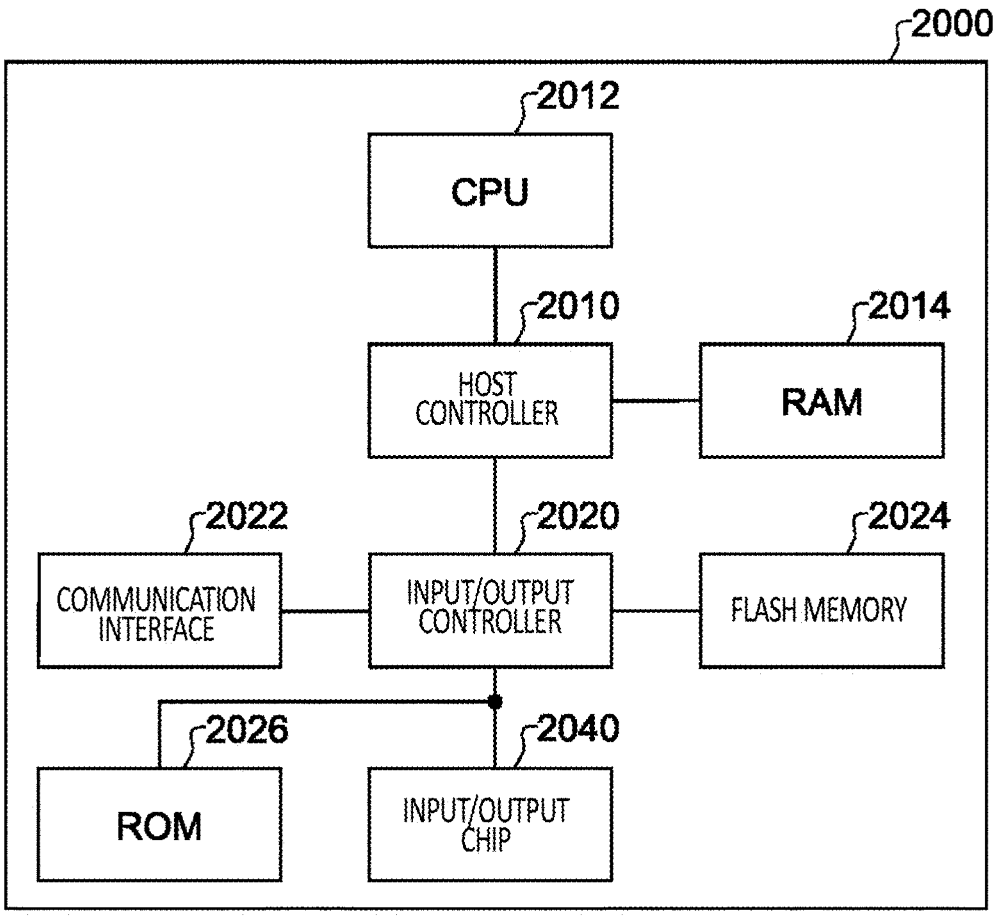
FIG. 6 shows an example of a computer 2000.

FIG. 6 shows an example of a computer 2000 in which a plurality of embodiments of the present invention may be entirely or partially embodied. A program installed on the computer 2000 can cause the computer 2000 to function as an apparatus such as the assistance apparatus 60 and the like according to the embodiments or each unit of the apparatus, to perform an operation associated with the apparatus or each unit of the apparatus, and/or perform a process according to the embodiments or steps of the process. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, and thereby controls each unit.

The communication interface 2022 communicates with another electronic device via a network. The flash memory 2024 stores a program and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a USB port, a HDMI (registered trademark) port.

A program is provided via a network or a computer-readable storage medium such as a CD-ROM, a DVD-ROM, or a memory card. The RAM 2014, the ROM 2026, or the flash memory 2024 is an example of the computer-readable storage medium. The program is installed in the flash memory 2024, the RAM 2014, or the ROM 2026, and executed by the CPU 2012. Information processing written in these programs is read by the computer 2000, and provides cooperation between the programs and the various types of hardware resources described above. An apparatus or a method may be actualized by executing operations or processing of information depending on a use of the computer 2000.

For example, when a communication is executed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and execute various kinds of processing on the data on the RAM 2014. Next, the CPU 2012 writes back the processed data into the recording medium.

Various types of information such as various types of programs, data, a table, and a database may be stored in the recording medium and may be subjected to information processing. The CPU 2012 may execute, on the data read from the RAM 2014, various kinds of processing including various kinds of operations, information processing, conditional judgement, conditional branching, unconditional branching, information retrieval/replacement, or the like described herein and specified by instruction sequences of the programs, and write back a result into the RAM 2014. In addition, the CPU 2012 may retrieve information in a file, a database, or the like in the recording medium. For example, when multiple entries each having an attribute value of a first attribute associated with an attribute value of a second attribute, is stored in the recording medium, the CPU 2012 may retrieve an entry having a designated attribute value of the first attribute that matches a condition from these multiple entries, and read the attribute value of the second attribute stored in this entry, thereby obtaining the attribute value of the second attribute associated with the first attribute that satisfies a predetermined condition.

The programs or software modules described above may be stored in the computer-readable storage medium on the computer 2000 or in the vicinity of the computer 2000. A recording medium such as a hard disk or a RAM provided in a server system connected to a dedicated communication network or the Internet can be used as the computer-readable storage medium. A program stored in the computer-readable storage medium may be provided to the computer 2000 via a network.

A program that is installed on the computer 2000 and causes the computer 2000 to function as the assistance apparatus 60 may work on a CPU 2012 and the like, to cause the computer 2000 to respectively function as each unit (for example, the assistance control apparatus 200 and the like) of the assistance apparatus 60. The information processing written in these programs are read by the computer 2000 to cause the computer 2000 to function as each unit of the assistance apparatus 60 that is a specific mean obtained by various types of hardware resources described above cooperating with a software. These specific means implement operations or processing of information according to the intended use of the computer 2000 in the present embodiment, and the assistance apparatus 60 is thereby constructed to be specific for the intended use.

Various embodiments have been described with reference to the block diagrams and the like. In the block diagrams, each block may represent (1) a stage of a process in which an operation is executed, or (2) components of the apparatus having a role in executing the operation. A specific stage and component may be implemented by a dedicated circuit, a programmable circuit supplied with computer-readable instructions stored on a computer-readable storage medium, and/or a processor supplied with computer-readable instructions stored on a computer-readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and another logical operation, and a memory element such as a flip-flop, a register, a field programmable gate array (FPGA), a programmable logic array (PLA), or the like.

The computer-readable storage medium may include any tangible device capable of storing instructions to be executed by an appropriate device. Thereby, the computer-readable storage medium having instructions stored therein forms at least a part of a product including instructions which can be executed to provide means for executing processing procedures or operations specified in the block diagrams. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disc (DVD), a Blu-ray (registered trademark) disc, a memory stick, an integrated circuit card, or the like.

The computer-readable instructions may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, and a conventional procedural programming language such as a "C" programming language or a similar programming language.

Computer-readable instructions may be provided to a processor of a general purpose computer, a special purpose computer, or another programmable data processing device, or to programmable circuit, locally or via a local area network (LAN), wide area network (WAN) such as the Internet, and a computer-readable instruction may be executed to provide means for executing operations specified in the described processing procedures or block diagrams. Examples of the processor include a computer processor, a processing unit, a microprocessor, a digital signal processor, a controller, a microcontroller, and the like.

While the present invention has been described above by using the embodiments, the technical scope of the present invention is not limited to the scope of the above-described embodiments. It is apparent to persons skilled in the art that various alterations or improvements can be made to the above described embodiments. It is also apparent from description of the claims that the embodiments to which such alterations or improvements are made can be included in the technical scope of the present invention.

The operations, procedures, steps, and stages etc. of each process performed by a device, system, program, and method shown in the claims, specification, or diagrams can be executed in any order as long as the order is not indicated by "before", "prior to", or the like and as long as the output from a previous process is not used in a later process. Even if the operation flow is described using phrases such as "first" or "next" for the sake of convenience in the claims, specification, or drawings, it does not necessarily mean that the process must be performed in this order.

EXPLANATION OF REFERENCES

10: assistance system;
20: vehicle;
40: in-vehicle processing apparatus;
60: assistance apparatus;
70: image-capturing apparatus;
80: pedestrian;
90: roadway;
100, 110, 120: warning output apparatus;
112, 114: light emitter
150: area
200: assistance control apparatus
250: acquisition unit;
210: first determination unit;
220: second determination unit;
260: assistance control unit
270: reception control unit;
280: storage apparatus;
290: communication apparatus;
2000: computer;
2010: host controller;
2012: CPU;
2014: RAM;
2020: input/output controller;
2022: communication interface;
2024: flash memory;
2026: ROM;
2040: input/output chip.

What is claimed is:

1. An assistance control apparatus, comprising:

an acquisition unit that acquires location information of a first moving object and a second moving object;

a first determination unit that determines whether a traffic assistance for the first moving object and the second moving object needs to be performed based on the location information of the first moving object and the second moving object;

a second determination unit that determines, when it is determined by the first determination unit that the traffic assistance for the first moving object and the second moving object needs to be performed, whether the first moving object and the second moving object can communicate with the assistance control apparatus; and an assistance control unit that performs, when it is determined by the second determination unit that the first moving object and the second moving object cannot communicate with the assistance control apparatus, a control for performing the traffic assistance for at least one of the first moving object or the second moving object without using communication means.

2. The assistance control apparatus according to claim 1, wherein the assistance control unit performs, when it is determined by the second determination unit that the at least one moving object of the first moving object or the second moving object can communicate with the assistance control apparatus, a control for performing the traffic assistance for the at least one moving object by using communication means.

3. The assistance control apparatus according to claim 2, wherein the assistance control unit performs, when it is determined by the second determination unit that the first moving object and the second moving object cannot communicate with the assistance control apparatus, a control for performing the traffic assistance for the at least one moving object of the first moving object or the second moving object through sound or visual means.

4. The assistance control apparatus according to claim 3, wherein the assistance control unit performs, when it is determined by the second determination unit that the first moving object and the second moving object cannot communicate with the assistance control apparatus, a control for performing, for the at least one moving object, the traffic assistance in a sound or visual manner through a moving object that is located in a predetermined range from the at least one moving object and that can communicate with the assistance control apparatus.

5. The assistance control apparatus according to claim 4, further comprising a reception control unit that performs a control for receiving, through communication means, location information of one or plurality of third moving objects that is transmitted from the one or plurality of third moving objects, wherein the assistance control unit performs, when it is determined by the second determination unit that the first moving object and the second moving object cannot communicate with the assistance control apparatus, a control for selecting, based on the location information of the one or plurality of third moving objects, a moving object that is located in the predetermined range from the at least one moving object and that can communicate with the assistance control apparatus among the one or plurality of third moving objects, and performing the traffic assistance in the sound or visual manner for the at least one moving objects through the moving object that is selected.

6. The assistance control apparatus according to claim 1, wherein the assistance control unit performs, when it is determined by the second determination unit that the first moving object and the second moving object cannot communicate with the assistance control apparatus, a control for performing the traffic assistance for at least one moving object of the first moving object or the second moving object through sound or visual means.

7. The assistance control apparatus according to claim 6, wherein the assistance control unit performs, when it is determined by the second determination unit that the first moving object and the second moving object cannot communicate with the assistance control apparatus, a control for performing, for the at least one moving object, the traffic assistance in a sound or visual manner through a moving object that is located in a predetermined range from the at least one moving object and that can communicate with the assistance control apparatus.

8. The assistance control apparatus according to claim 7, further comprising a reception control unit that performs a control for receiving, through communication means, location information of one or plurality of third moving objects that is transmitted from the one or plurality of third moving objects, wherein the assistance control unit performs, when it is determined by the second determination unit that the first moving object and the second moving object cannot communicate with the assistance control apparatus, a control for selecting, based on the location information of the one or plurality of third moving objects, the moving object that is located in the predetermined range from the at least one moving object and that can communicate with the assistance control apparatus among the one or plurality of third moving objects, and performing the traffic assistance in the sound or visual manner for the at least one moving objects through the moving object that is selected.

9. The assistance control apparatus according to claim 8, wherein the assistance control unit selects, when it is determined by the second determination unit that the first moving object and the second moving object cannot communicate with the assistance control apparatus, a moving object that is located in a predetermined range from the at least one moving object, that is existing ahead of an advancing direction of the at least one moving object, and that can communicate with the assistance control apparatus among the one or plurality of third moving objects.

10. The assistance control apparatus according to claim 6, wherein the assistance control unit performs, when it is determined by the second determination unit that the first moving object and the second moving object cannot communicate with the assistance control apparatus, for the at least one moving object, a control for performing the traffic assistance by using a display apparatus or an audio output apparatus provided on a path of the moving object.

11. The assistance control apparatus according to claim 1, wherein based on the location information of the first moving object and the second moving object, the first determination unit determines that the traffic assistance for the first moving object and the second moving object needs to be performed when the first moving object has a risk of approaching the second moving object.

12. The assistance control apparatus according to claim 9, wherein the assistance control unit performs, when it is determined by the second determination unit that the first moving object and the second moving object cannot communicate with the assistance control apparatus, for at least one moving object of the first moving object or the second moving object, a control for informing information indicating a location of another moving object or a distance to another moving object, by using a display apparatus or an audio output apparatus provided on a path of the at least one moving object.

13. The assistance control apparatus according to claim 11, wherein the assistance control unit performs, when it is determined by the second determination unit that the first moving object and the second moving object cannot communicate with the assistance control apparatus, for at least one moving object of the first moving object or the second moving object, a control for emphasizing and outputting warning information as a risk of approaching another moving object is higher, by using a display apparatus or an audio output apparatus provided on a path of the at least one moving object.

14. The assistance control apparatus according to claim 1, wherein the acquisition unit acquires location information of the first moving object and the second moving object detected by an image-capturing apparatus.

15. The assistance control apparatus according to claim 14, further comprising:

a reception control unit that performs a control for receiving, through communication means, location information of one or plurality of third moving objects that is transmitted from the one or plurality of third moving objects, wherein the second determination unit determines, when the image-capturing apparatus detects the location information of the first moving object and the second moving object and no location information for matching the location information of the first moving object and the second moving object by a control of the reception control unit is received, that the first moving object and the second moving object cannot communicate with the assistance control apparatus.

16. The assistance control apparatus according to claim 1, wherein the first moving object is a vehicle.

17. The assistance control apparatus according to claim 16, wherein the first moving object is a vehicle, and the second moving object is a pedestrian.

18. The assistance control apparatus according to claim 16, wherein the acquisition unit acquires the location information of the first moving object and the second moving object detected by an image-capturing apparatus installed on a roadway.

19. An assistance control method, comprising:

acquiring location information of a first moving object and a second moving object;

determining whether a traffic assistance for the first moving object and the second moving object needs to be performed based on the location information of the first moving object and the second moving object;

determining, when it is determined that the traffic assistance for the first moving object and the second moving object needs to be performed, whether the first moving object and the second moving object can communicate with an assistance control apparatus that performs a control for a traffic assistance; and performing, when it is determined that the first moving object and the second moving object cannot communicate with the assistance control apparatus, a control for performing a traffic assistance for at least one of the first moving object or the second moving object without using communication means.

20. A non-transitory computer-readable storage medium having a program stored thereon, the program causes a computer to function as:

an acquisition unit that acquires location information of a first moving object and a second moving object;

a first determination unit that determines whether a traffic assistance for the first moving object and the second moving object needs to be performed based on the location information of the first moving object and the second moving object;

a second determination unit that determines, when it is determined by the first determination unit that the traffic assistance for the first moving object and the second moving object needs to be performed, whether the first moving object and the second moving object can communicate with an assistance control apparatus that performs a control for performing a traffic assistance; and an assistance control unit that performs, when it is determined by the second determination unit that the first moving object and the second moving object cannot communicate with the assistance control apparatus, a control for performing a traffic assistance for at least one of the first moving object or the second moving object without using communication means.

* * * * *